No. 738,330. PATENTED SEPT. 8, 1903.
R. W. HUDSON.
CASH REGISTER.
APPLICATION FILED APR. 24, 1902.
NO MODEL. 5 SHEETS—SHEET 1.

WITNESSES. INVENTOR.
Ruth J. Mitchell. Richard W. Hudson,
A. M. Meyner. By Mason Fenwick & Lawrence.
His Attorneys.

No. 738,330. PATENTED SEPT. 8, 1903.
R. W. HUDSON.
CASH REGISTER.
APPLICATION FILED APR. 24, 1902.
NO MODEL. 5 SHEETS—SHEET 2.
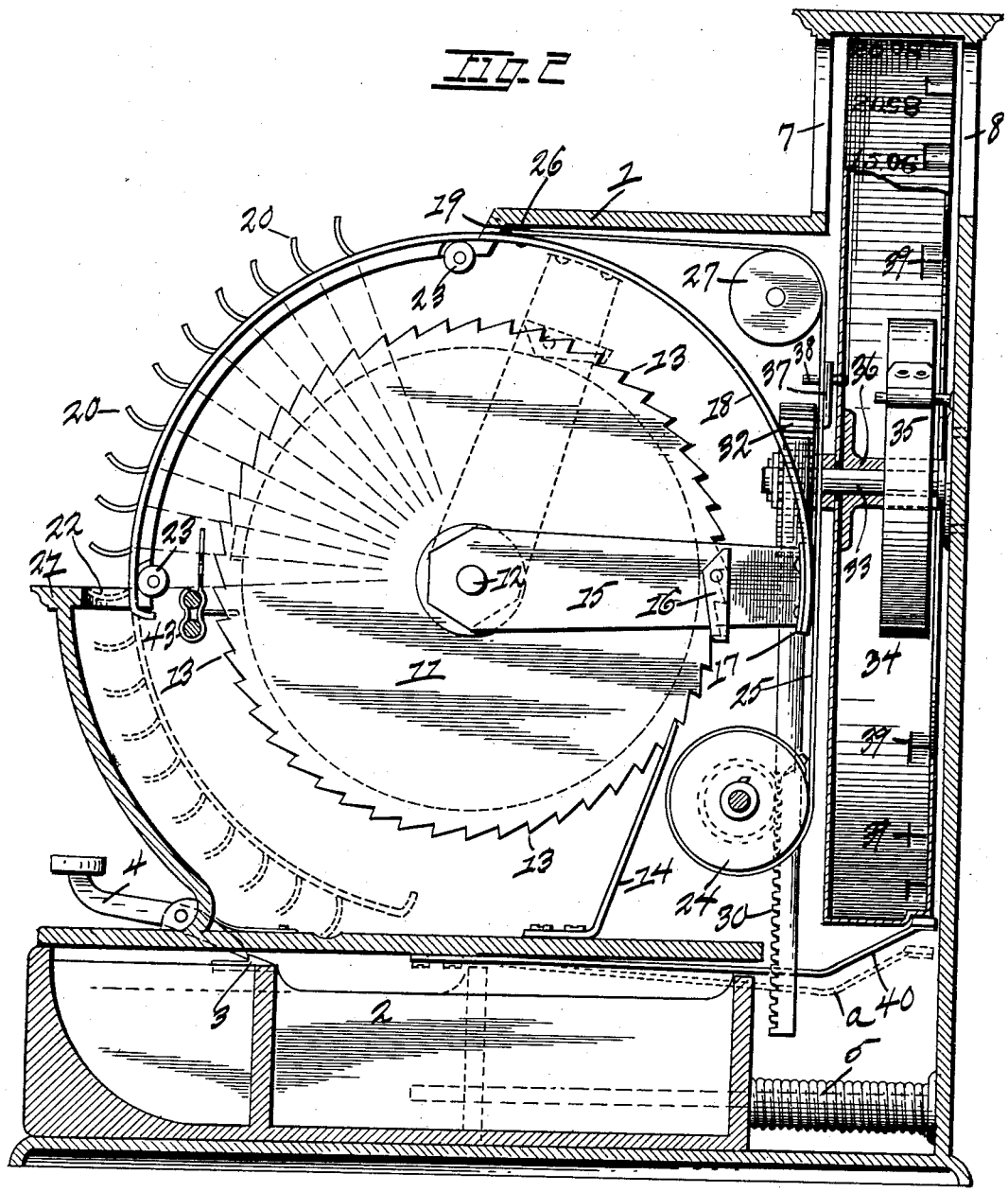
WITNESSES
INVENTOR
By Richard W. Hudson
Mason Fenwick & Lawrence
His Attorneys No. 738,330. PATENTED SEPT. 8, 1903.
R. W. HUDSON.
CASH REGISTER.
APPLICATION FILED APR. 24, 1902.
NO MODEL. 5 SHEETS—SHEET 3.

WITNESSES
Ruth J. Mitchell.
A. M. Meyner

INVENTOR
Richard W. Hudson
By Mason, Fenwick & Lawrence,
His Attorneys.

No. 738,330. PATENTED SEPT. 8, 1903.
R. W. HUDSON.
CASH REGISTER.
APPLICATION FILED APR. 24, 1902.
NO MODEL. 5 SHEETS—SHEET 5.

WITNESSES
Ruth J. Mitchell
A. M. Meynes

INVENTOR
Richard W. Hudson
By Mason, Fenwick & Lawrence
His Attorneys.

No. 738,330. Patented September 8, 1903.

UNITED STATES PATENT OFFICE.

RICHARD W. HUDSON, OF TOLEDO, OHIO, ASSIGNOR OF TWO-THIRDS TO LEROY I. PLUMMER, OF TOLEDO, OHIO.

CASH-REGISTER.

SPECIFICATION forming part of Letters Patent No. 738,330, dated September 8, 1903.

Application filed April 24, 1902. Serial No. 104,547. (No model.)

*To all whom it may concern:*

Be it known that I, RICHARD W. HUDSON, a citizen of the United States, residing at Toledo, in the county of Lucas and State of Ohio, have invented certain new and useful Improvements in Cash-Registers; and I do hereby declare the following to be a full, clear, and exact description of the invention, such as will enable others skilled in the art to which it appertains to make and use the same.

My invention has reference to a cash-register, and has for its object to provide simple, novel, and effective mechanism for registering and indicating the amount of a purchase.

In carrying out my invention I employ the arrangement and the parts and combination of parts hereinafter shown, described, and claimed.

Figure 1:
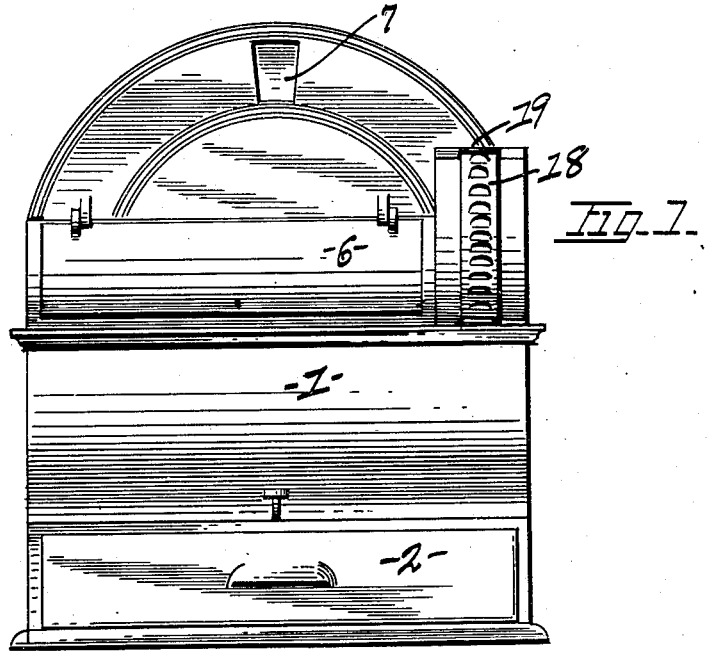
Figure 7:
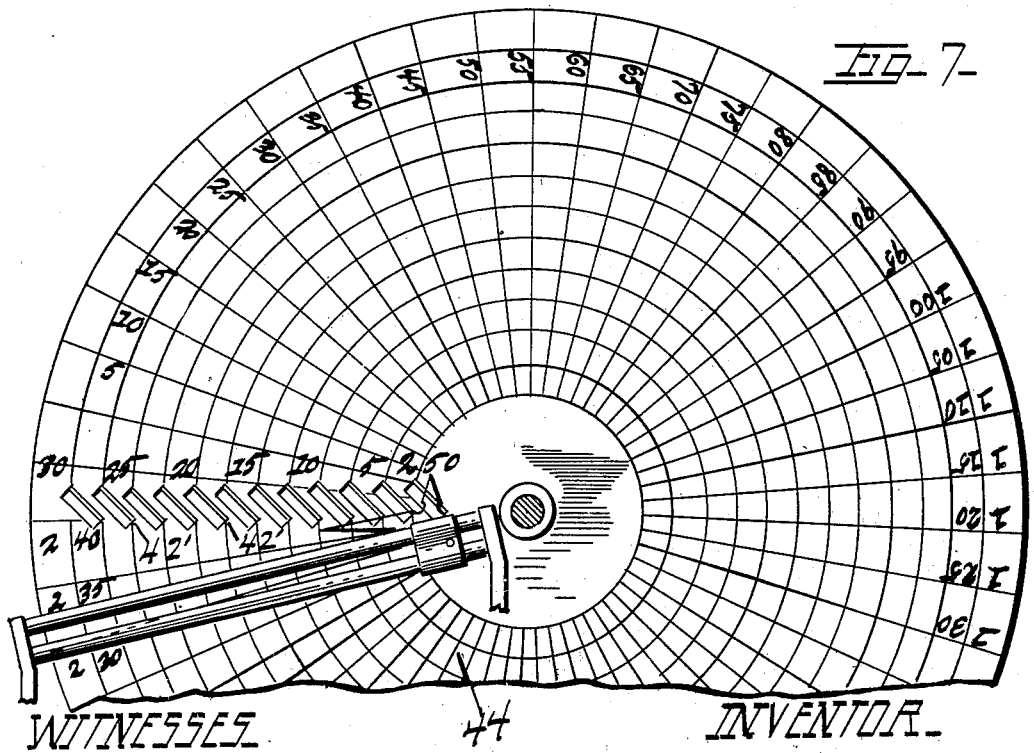
Figure 3:
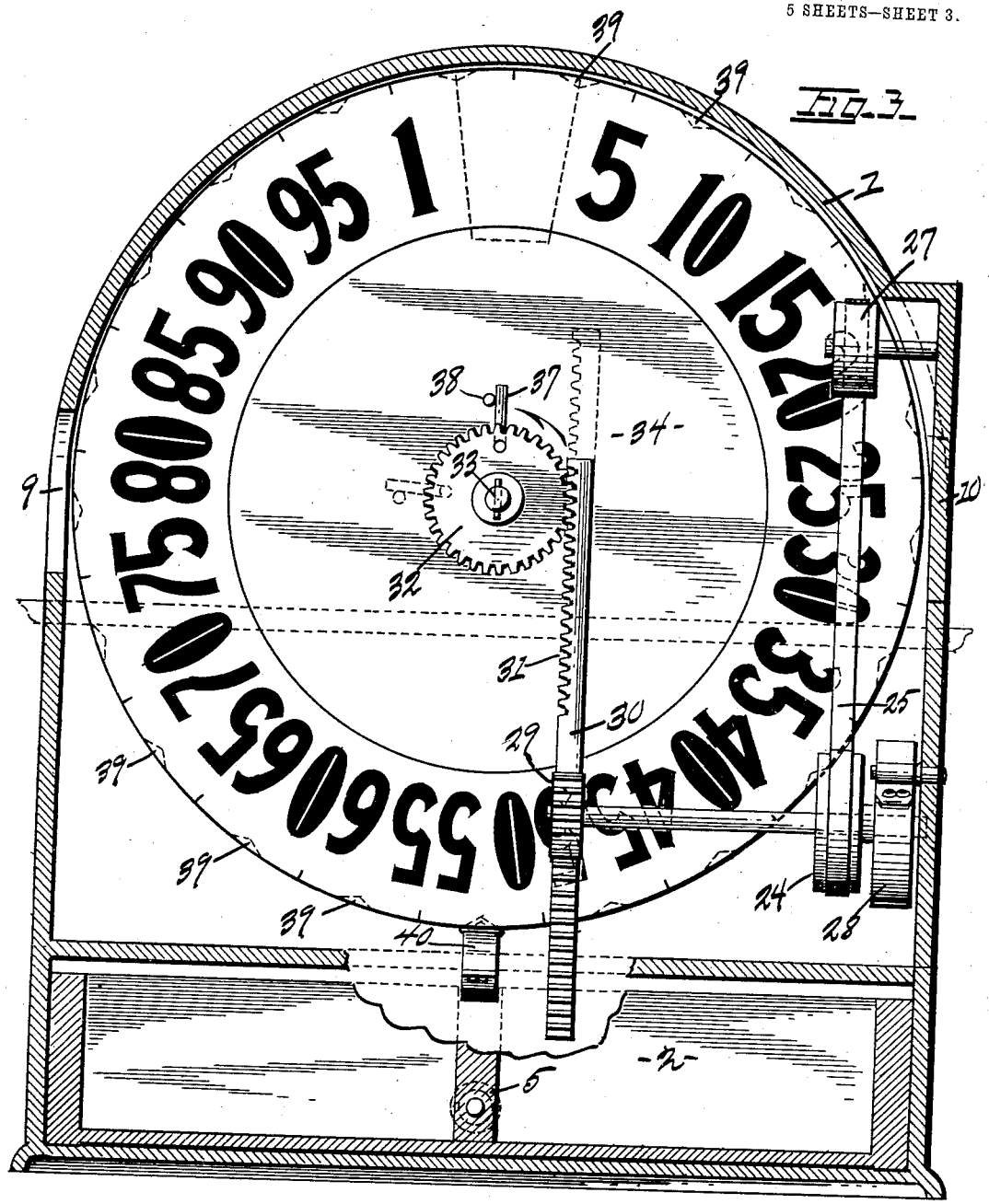
Figure 4:
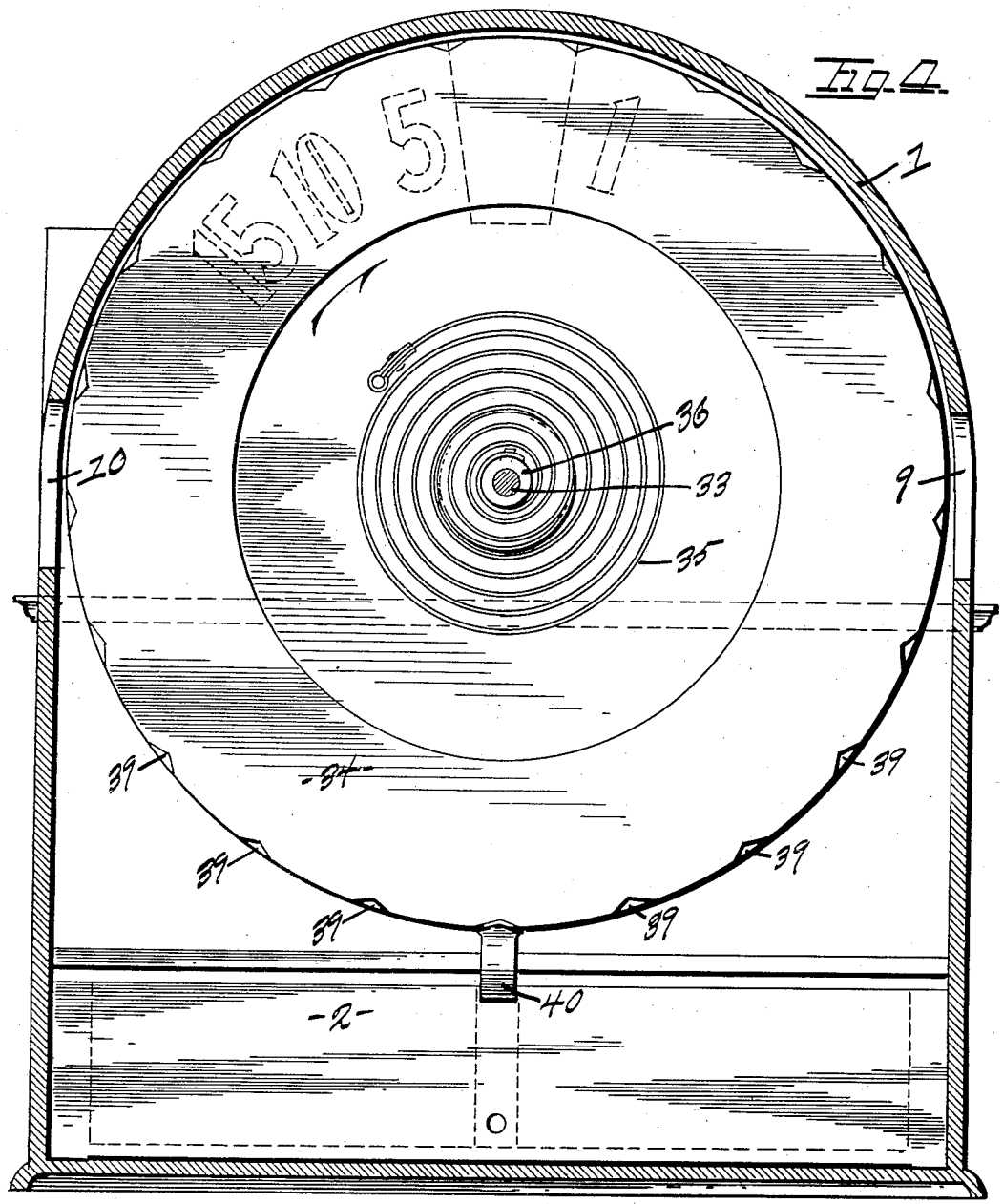
Figure 5:
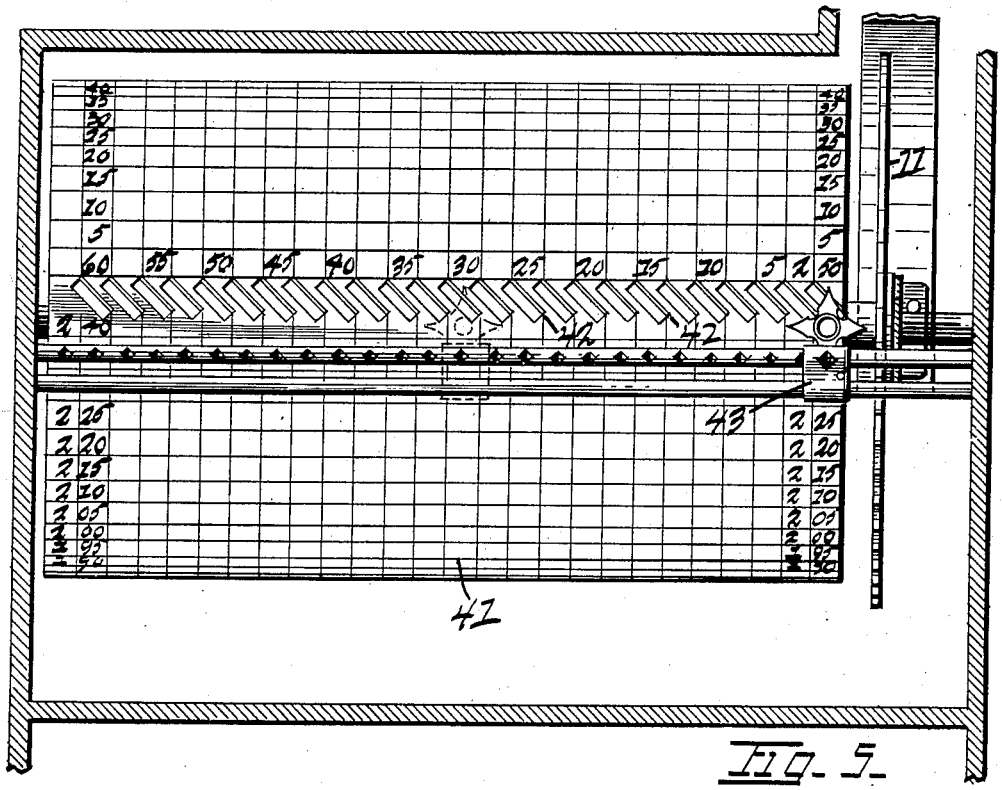
Figure 6:
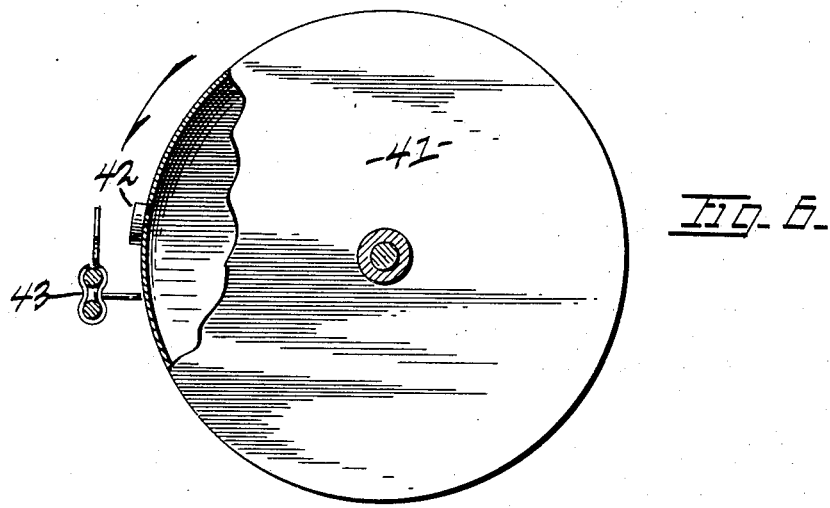

In the drawings, Figure 1 is a front elevation of my cash-register, showing the preferred arrangement of the case. Fig. 2 is a section through the case, showing the mechanism. The indicator-drum in this figure is shown in half-section. Fig. 3 is a front view of the indicator-drum and the means for operating the same. The case is shown in section. Fig. 4 is a similar view showing the rear of the indicating-drum and the means employed to return the same to its normal position. Fig. 5 is a front view of the registering mechanism. Fig. 6 is an elevation, partly in section, showing the end of the registering-cylinder. Fig. 7 is a front view of a disk, showing a modification of the registering mechanism.

Referring to the parts, 1 indicates the case, having the general outline and arrangement shown in Fig. 1.

2 is a cash-drawer provided with a catch 3, adapted to be engaged by the end of the key-lever 4. When the key on the outer end of the key-lever is depressed, the drawer will be released and be forced outward by the action of the coiled spring 5.

6 is a hinged section of the case, provided with a suitable lock to permit examination of the numerals on the registering-cylinder.

7 is an opening through the case to disclose the numerals upon the front face of the indicator-drum. In like manner there is provided an opening 8 in the case opposite to the opening 7, through which the numerals on the rear face of the indicator-cylinder may be read.

9 and 10, respectively, are openings in the sides of the case through which numerals on the periphery of the indicator-drum may be read. It is to be observed that four series of numerals are provided upon the indicator-drum and that there are four openings provided in the case, through which the numerals may be read from the front and rear of the machine and also the sides.

11 is a counter-wheel rotatably mounted upon a rod 12, extending crosswise of the case. Counter-wheel 11 is in the form of a disk having peripheral ratchet-teeth 13, and 14 is a spring-pawl adapted to engage the teeth 13 and prevent backward rotation of the counter-wheel. The ratchet-teeth are in number a multiple of ten, and, as illustrated in the drawings, I provide fifty teeth upon the periphery of the counter-wheel.

15 is a vibrating arm mounted upon the rod 12 alongside of the counter-wheel, and the same is provided with a pivoted and gravity-operated pawl 16, adapted to engage the teeth of the counter-wheel. The vibrating arm 15 extends beyond the periphery of the counter-wheel, and the same is secured at 17 to an arc-shaped operating-plate 18, having an axis of curvature coincident with the axis of rotation of the counter-wheel. Plate 18 extends through an opening 19 in the case and is exposed on the forward side of the case, the case being arc-shaped on its forward side to conform to the shape of the operating-plate.

20 represents radially-extending fingers provided upon the operating-plate. These are arranged at equidistant points, the angle between the same measured from the axis of curvature of the operating-plate being equivalent to the angle between the ratchet-teeth upon the counter-wheel.

21 is a ledge formed on the case, and 22 is an opening therethrough to permit the fingers 20 to pass when the operating-plate is forced downward. The lowermost finger upon the operating-plate normally assumes a position above the ledge on the case equal to the distance between the fingers.

23 represents antifriction-wheels to insure the easy operation of the operating-plate.

24 is a band-wheel to the periphery of which is attached one end of a flexible metallic band 25, the opposite end of which is attached at 26 to the operating-plate 18.

27 is an idle pulley, over which the band 25 is guided.

28 is a band-spring, the inner end of which is secured to the hub of the band-wheel 24 in the usual manner of mounting springs of this character. The outer end of the band-spring is attached to a laterally-projecting stud extending from the side of the case, being thereby held in a partly-wound state. By the means described the band 25 is subjected to constant tension and the operating-plate is normally held in the position shown in full lines, Fig. 2, The arrangement of the parts thus far described is identical with that employed in my cash-register for which application for Letters Patent of the United States was filed June 26, 1901, Serial No. 66,061.

I will now describe the novel indicating mechanism which I employ in my present invention.

Upon the shaft which carries the band-wheel 24 is keyed or otherwise secured a pinion 29, which meshes with a vertically-movable rack 30. Upon the sides of said rack are provided gear-teeth 31, which mesh with the pinion 32, which is free to rotate upon a stud 33, secured to the case. Upon the stud 33 is also rotatably mounted the indicator-drum 34.

35 is a coiled band-spring having its inner end connected with the hub 36 of the indicator-drum. The outer end is held from movement by any suitable means. The band-spring serves the purpose of returning the indicator-drum to its normal position, the action thereof being apparent.

37 is a pin which projects in a radial direction from the pinion 32. This pin is adapted to contact with a pin 38, projecting outward from the face of the indicator-drum.

Upon the front and rear faces of the indicator-drum, near the periphery thereof, are provided at equidistant points a series of numbers, "5" "10" "15" "20," to indicate the amount registered. These numerals appear through the openings 7 and 8 in the case and may be read from both the forward and rear side of the machine. Immediately to the left of the numeral "5" is a blank space to indicate that nothing has been registered when the drum is in its normal position. In like manner on the outer surface of the drum, to be read through the openings 9 and 10 in the case, are provided two series of numerals to correspond to those upon the front and rear faces of the drum.

To indicate the amount of a purchase, the proper finger upon the operating-plate is depressed until the finger of the operator contacts with the ledge on the case. The movement of the operating-plate about its axis will rotate the band-wheel 24, and consequently the gear 29. Since the gear 29 meshes with the rack 30, the latter will take an elevated position, the movement thereof being dependent upon the movement of the operating-plate. This will cause the pinion 32 to rotate, and since the pin 37 contacts with the pin 38 upon the face of the indicator-drum the latter will be made to turn upon its axis, the extent of the movement thereof also being dependent upon the extent of the movement of the operating-plate. The operating-plate on being released will immediately return to its normal position (shown in Fig. 2) because of the action of the band-wheel 24, the band-spring 28, and the band 25, the ends of which are connected with the band-wheel and the operating-plate. The rack and the pinion 32 will also return to their normal position, whereas the indicating-drum will remain in indicating position, the means for retaining the same in indicating position being as follows: Upon the periphery of the indicating-cylinder at points equal to the angle between the numerals thereon are provided recesses 39, designed to be engaged by a spring-stop 40. When the cash-drawer is closed, the same presses the stop 40 upward into contact with the periphery of the indicating-cylinder. The recesses 39 being tapered and the end of the stop 40 being of coincident conformation, the indicator-cylinder may be rotated, even though the stop be in contact therewith. When the drum has been rotated to the proper point to indicate the amount registered, the spring-stop will enter one of the recesses 39 and hold the same from return movement. The opening of the cash-drawer will release the spring-stop, which will thereupon assume the position a in dotted lines, Fig. 2, and the indicator-cylinder will consequently be released and return to its normal position. (Shown in Fig. 3.)

The means which I employ to register the total amount indicated by the device is as follows: As has hereinbefore been described, the counter-wheel 11 is provided on its periphery with fifty ratchet-teeth. When a nickel is to be registered, the lower finger upon the operating-plate is pressed downward until the finger of the operator is in contact with the ledge of the case. This operation will cause the operating-plate to move in the arc of a circle for an angular distance equal to the angle between two adjacent fingers upon the operating-plate. The counter-wheel will therefore also rotate on its axis in the arc of a circle measured by an equal angle, which will be the angle between two adjacent teeth upon the periphery thereof. In like manner if it is desired to register two nickels or ten cents the second finger upon the operating-plate is depressed, which will cause the counter-wheel to rotate a distance measured by two teeth. Connected with the counter-wheel so as to rotate simultaneously therewith is cylinder 14, the same being preferably constructed of sheet metal. The surface of the cylinder is divided longitudinally into fifty equal spaces, corresponding to the teeth of the counter-wheel. When the counter-wheel is advanced the distance of a single tooth, the cylinder 41 will also rotate the distance of a single space and register five cents. When the cylinder has made a complete revolution, the same will register two dollars and fifty cents. In order to indicate the total amount registered, I have provided lengthwise of the cylinder a series of diagonal ridges 42. Immediately forward of the cylinder are two parallel rods, which serve as guides for the indicator-carriage 43. Provided upon the carriage is an inwardly-extending pin arranged to extend inwardly in the path of rotation of the ridges upon the registering-cylinder. The ridges are arranged upon the cylinder so that one end of each will slightly overlap the other in its rotation. As the registering-cylinder is rotated the indicator-carriage will advance along the parallel rods because of engagement of the pin thereon with the ridges upon the cylinder. It is evident that each advance of the carriage will indicate an amount equal to two dollars and fifty cents. For convenience in reading, the numerals upon the cylinder from right to left indicate five dollars, ten dollars, fifteen dollars, &c. Upon either end of the cylinder are indicated the amount registered below two dollars and fifty cents, so that the total amount registered by the machine is the sum of the amount indicated above the ridges on the cylinder and the amount indicated at the ends of the cylinder. For example, when the indicator-carriage has assumed a position shown in dotted lines, Fig. 5, the total amount registered at that time will be thirty-two dollars and forty cents.

In Fig. 7 I have shown a modification of the registering device. This embodies a disk 44, adapted to take the place of the registering-cylinder 41, rotating simultaneously with the counter-wheel 11. The same is divided radially into fifty spaces to correspond to the teeth of the counter-wheel. Immediately forward of the disk are arranged parallel rods carrying an indicator, being in every respect identical with the arrangement hereinbefore described. Extending outward from the face of the disk and arranged in a radial line are a series of ridges 42', which are adapted to engage the pin upon the indicator-carriage and advance the carriage along the guides.

From the foregoing the simple construction and positive operation of the device will be apparent.

Having thus fully described my invention, what I claim as new, and desire to secure by Letters Patent, is—

1. A cash-register, comprising a counter-wheel, means for turning the counter-wheel to different positions, in accordance with the purchases to be recorded, an indicator-drum exposing the amount of the purchase, mechanism operated by the counter-wheel-actuating means for controlling the indicator and moving it in accordance with said counter-wheel, and means for returning the indicator-drum to its normal position independent of the counter-wheel mechanism, substantially as described.

2. A cash-register, comprising a serrated counter-wheel, a segment for moving it in accordance with the amount of the purchase to be indicated and registered, an indicator-drum, means for operating the said drum in accordance with the movement of the counter-wheel, a registering means also operated by the counter-wheel, and means for permitting the indicator-drum to return to its normal position without disturbing the counter-wheel, substantially as described.

3. A cash-register, comprising a counter disk or wheel, means for operating the same in accordance with the amount of a purchase, an indicator means also operated by said counter-wheel-operating means, means for holding the counter-wheel against a reverse movement, the counter-wheel-operating mechanism returning to its normal position without affecting the same, a cash-drawer, and means adapted to engage with the indicator-disk for holding the latter in its indicating position, such means being moved out of contact with the disk by the opening of the cash-drawer, substantially as described.

4. A cash-register having a counter-wheel, a segment for engaging and moving the wheel forwardly, an indicator disk or drum having notches in its periphery mounted in the register-gearing for operating the same, means connecting the said gearing with the segment, means affected by the movement of the cash-drawer for engaging with the notches in the indicator-drum for holding the latter in its indicating position and means for returning the segment and the indicator-wheel to their normal positions independently of each other, substantially as described.

5. A cash-register provided with a counter-wheel, means for operating the same, an indicator disk or drum revolubly mounted in the cash-register, a pinion for operating the same, a reciprocating rack-bar engaging said pinion, and means comprising a drum, pinion and flexible band connecting the counter-wheel-operating mechanism with said rack-bar for reciprocating the same, substantially as described.

6. A cash-register provided with a counter-wheel, a mechanism for operating the same, an indicator-disk mounted in the register-frame, a pinion capable of moving the said disk or drum in one direction, means for temporarily holding the disk in its adjusted positions, a rack-bar engaging said pinion, a second pinion for operating the rack-bar, a drum for actuating the said second pinion, a flexible band connecting the said drum with the counter-wheel-operating mechanism, and means for returning the said drum and the said indicator disk or drum each to its normal position without interfering with the other, substantially as described.

7. A cash-register provided with a counter mechanism, an indicator-drum, means for operating said indicator-drum in connection with the same, a registering-drum carried by the counter mechanism, a series of detents projecting from the said drum, a sliding indicator moving in front of the drum, bars supporting the said sliding indicator, a pin or stud projecting from said indicator, the detents engaging the same and moving it forward after each revolution of the drum, substantially as described.

8. A cash-register provided with a counter mechanism, a registering-drum carried by the said counter mechanism and provided with a series of inclined projections properly spaced apart, said indications being marked on the drum at each end and at intermediate points, a sliding indicator or pointer adapted to be moved to points opposite the indications on the said drum, bars supporting the said sliding indicator, a pin or stud projecting from said indicator and arranged so as to be struck successively by the inclined projections on the registering-drum so that the indicator will be moved along one step at a time at each revolution of the drum, substantially as described.

9. A cash-register provided with a counter-wheel, an indicator disk or drum formed with a series of depressions in its periphery, a spring engaging the same for holding the indicator-drum in its adjusted positions, the spring being arranged so as to be released when the cash-drawer is open thereby releasing the drum, and means for returning the drum to its normal position, substantially as described.

10. A cash-register comprising a counter-wheel, means for feeding the counter-wheel forward, a disk or drum for indicating the amount of a purchase, a spring for tending to keep the drum in its normal position, a pin or stud projecting from one face of the drum, a pinion provided with a projection for engaging the said pin, means for operating the pinion through the operation of the counter-wheel-setting mechanism, and means for returning the counter-wheel-operating mechanism before the indicator disk or drum is returned to its normal position, substantially as described.

In testimony whereof I hereunto affix my signature in presence of two witnesses.

RICHARD W. HUDSON.

Witnesses:
CARL H. KELLER,
JAS. W. CORWIN.